United States Patent
Garcia et al.

(10) Patent No.: US 10,588,131 B2
(45) Date of Patent: Mar. 10, 2020

(54) METHOD AND NETWORK NODE FOR DYNAMIC RESOURCE ALLOCATION FOR CONTROL CHANNELS

(71) Applicant: Telefonaktiebolaget LM Ericsson (publ), Stockholm (SE)

(72) Inventors: Virgile Garcia, Beijing (CN); Edgar Ramos, Espoo (FI); Helka-Liina Määttanen, Helsinki (FI); Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/104,076

(22) PCT Filed: Aug. 5, 2015

(86) PCT No.: PCT/CN2015/086105
§ 371 (c)(1),
(2) Date: Jun. 13, 2016

(87) PCT Pub. No.: WO2017/020271
PCT Pub. Date: Feb. 9, 2017

(65) Prior Publication Data
US 2017/0245283 A1    Aug. 24, 2017

(51) Int. Cl.
*H04W 72/04* (2009.01)
*H04L 12/26* (2006.01)
*H04W 24/08* (2009.01)

(52) U.S. Cl.
CPC ......... *H04W 72/0486* (2013.01); *H04L 43/16* (2013.01); *H04W 24/08* (2013.01); *H04W 72/0446* (2013.01); *H04W 72/0406* (2013.01)

(58) Field of Classification Search
CPC ......... H04W 72/0486; H04W 72/0446; H04W 24/08; H04L 43/16
See application file for complete search history.

(56) References Cited

U.S. PATENT DOCUMENTS 5,778,318 A * 7/1998 Talarmo .............. H04W 72/082
                                                        370/341
8,112,083 B1   2/2012 Sigg et al.
(Continued)

FOREIGN PATENT DOCUMENTS

CN  101345985   1/2009
CN  101384073   3/2011
(Continued)

OTHER PUBLICATIONS

PCT Notification of Transmittal of the International Search Report and the Written Opinion of the International Searching Authority, or the Declaration for International application No. PCT/CN2015/086105—dated Apr. 28, 2016.
(Continued)

*Primary Examiner* — Minjung Kim
(74) *Attorney, Agent, or Firm* — Baker Botts, LLP

(57) ABSTRACT

The present disclosure provides a method (300) in a network node for dynamic resource allocation for control channels. The method (300) comprises: monitoring (S310) a control channel load on the network node; and adjusting (S320) resource allocation for control channels based on the control channel load.

38 Claims, 5 Drawing Sheets

(56) References Cited

U.S. PATENT DOCUMENTS

| | | | | |
|---|---|---|---|---|
| 9,615,283 B1* | 4/2017 | Zhou | ............... | H04W 28/0205 |
| 2003/0003921 A1 | 1/2003 | Laakso | | |
| 2004/0082333 A1* | 4/2004 | Ito | ............... | H04B 7/0837 |
| | | | | 455/450 |
| 2005/0036461 A1* | 2/2005 | Keil | ............... | H04J 13/0044 |
| | | | | 370/329 |
| 2006/0003799 A1* | 1/2006 | Dawood | ............... | H04W 28/18 |
| | | | | 455/552.1 |
| 2006/0068819 A1* | 3/2006 | Ito | ............... | H04J 3/0608 |
| | | | | 455/502 |
| 2008/0151751 A1* | 6/2008 | Ponnuswamy | ....... | H04L 1/0017 |
| | | | | 370/232 |
| 2010/0291938 A1* | 11/2010 | Jang | ............... | H04W 72/042 |
| | | | | 455/450 |
| 2012/0044834 A1 | 2/2012 | Cheng et al. | | |
| 2012/0147765 A1 | 6/2012 | Wigren | | |
| 2014/0029531 A1* | 1/2014 | Chang | ............... | H04W 16/14 |
| | | | | 370/329 |
| 2015/0245368 A1* | 8/2015 | Nukala | ............... | H04B 7/0417 |
| | | | | 370/330 |
| 2015/0373731 A1 | 12/2015 | Quan et al. | | |
| 2015/0382372 A1* | 12/2015 | Vajapeyam | ........... | H04W 24/10 |
| | | | | 370/329 |

FOREIGN PATENT DOCUMENTS

| | | |
|---|---|---|
| CN | 103457689 A | 12/2013 |
| EP | 2 677 808 | 9/2012 |
| WO | 2008 155732 A2 | 12/2008 |
| WO | 2014 131190 A1 | 9/2014 |

OTHER PUBLICATIONS

Office Action Issued by the Intellectual Property Office of ROC (Taiwan) for Patent Application No. 105120350—dated Jun. 6, 2017.

Document: FP7-ICT-317669-METIS/D2.4 (public); pp. 13-16—Feb. 28, 2015.

Token Ring/IEEE 802.5 from DocWiki; http://docwiki.cisco.com/wiki/Token_Ring/IEEE_802.5—Aug. 7, 2015.

3GPP TS 36.423 v11.1.0; Technical Specification; 3rd Generation Partnership Project; Technical Specification Group Radio Access Network; Evolved Universal Terrestrial Radio Access Network (E-UTRAN); X2 Application Protocol (X2AP) (Release 11)—Jun. 2012

PCT Notification of Transmittal of International Preliminary Report on Patentability (Chapter II of the Patent Cooperation Treaty) for International application No. PCT/CN2015/086105—dated Nov. 23, 2017.

Office Action of the Intellectual Property Office of Taiwan issued for Patent Application No. 105120350—dated Jan. 22, 2018.

Office Action issued by the Intellectual Property Office of Taiwan for Patent Application No. 105120350—dated Aug. 31, 2018.

Office Action of the Intellectual Property Office of Taiwan issued for ROC (Taiwan) Patent Application No, 105120350—Feb. 22, 2019.

Extended European Search Report for Application No./Patent No. 15900046.2—1215 / 3332580 PCT/CN2015086105—dated Feb. 12, 2019.

* cited by examiner

US 10,588,131 B2

METHOD AND NETWORK NODE FOR DYNAMIC RESOURCE ALLOCATION FOR CONTROL CHANNELS

PRIORITY

This nonprovisional application is a U.S. National Stage Filing under 35 U.S.C. § 371 of International Patent Application Serial No. PCT/CN2015/086105, filed Aug. 5, 2015, and entitled "Method And Network Node For Dynamic Resource Allocation For Control Channels."

TECHNICAL FIELD

The disclosure relates to communication technology, and more particularly, to a method and a network node for dynamic resource allocation for control channels.

BACKGROUND

Currently, mobile communication technologies are evolving towards higher frequency, larger carrier bandwidth, higher data rate and more heterogeneous layers. Future mobile networks, e.g., the $5^{th}$ Generation (5G) mobile networks, are likely to be a combination of the $3^{rd}$ Generation (3G) technologies, the $4^{th}$ Generation (4G) technologies and new features such as Ultra-Density Network (UDN) or millimeter Wave Radio Access Technology (mmW-RAT).

FIG. 1 shows an exemplary structure of a mobile network. As shown in FIG. 1, a cluster of Access Nodes (ANs) 104 and 106 are connected to and controlled by a coordinator node referred to as Central Control Unit (CCU) 102. User devices 110, 112, 114 and 116 are served by the AN 104 and a user device 118 is served by the AN 106.

In a mobile network, one carrier may consist of a number of sub-carriers. Each sub-carrier can have a certain bandwidth, e.g. 100 MHz, and the total carrier bandwidth can be up to 1 GHz or even higher. FIG. 2 illustrates an exemplary carrier containing 4 sub-carriers. In FIG. 2, the smallest resource grid in time and frequency is referred to as a resource element (RE) or an Atomic Scheduling Unit (ASU).

Conventionally, there are two major types of resource allocation schemes. The first one is known as contention based resource allocation, which is typically used in e.g., Wi-Fi networks. In Wi-Fi networks, resources for transmission of control channels are fully shared with resources for data transmission. Further, there is no fixed frame structure in Wi-Fi networks and thus a control channel may occupy the entire network bandwidth, resulting in a high control overhead and lack of flexibility and efficiency in resource utilization. The second one is known as scheduling based resource allocation, which is typically used in cellular networks such Long Term Evolution (LTE) network. In the LTE network, resource allocation for control channels is quite static and cannot be flexibly adapted to changes in network conditions.

There is thus a need for an improved solution for resource allocation for control channels.

SUMMARY

It is an object of the present disclosure to provide a method and a network node for dynamic resource allocation for control channels, capable of allocating resources for control channels in a more flexible and efficient way.

In a first aspect, a method in a network node for dynamic resource allocation for control channels is provided. The method comprises: monitoring a control channel load on the network node; and adjusting resource allocation for control channels based on the control channel load.

In an embodiment, the step of adjusting comprises: determining a current load status of the network node based on the control channel load; increasing a number of control channels on the network node if the current load status is determined to be overloaded with respect to the control channel load; and decreasing a number of control channels on the network node if the current load status is determined to be underloaded with respect to the control channel load.

In an embodiment, the step of determining comprises: estimating a load per control channel based on the control channel node; determining the current load status to be overloaded with respect to the control channel load when the load per control channel is higher than a first threshold, or to be underloaded with respect to the control channel load when the load per control channel estimated is lower than a second threshold.

In an embodiment, the control channel load is monitored based on at least one of: a number of active user devices served by the network node, a number of active transmissions to/from the network node, and a number of resource requests from user devices served by the network node.

In an embodiment, the step of adjusting further comprises: determining a number of control channels required for the control channel load based on a maximum allowable load per control channel. The maximum allowable load per control channel is dependent on at least one of: a maximum failure rate of requests, a maximum delay, a maximum channel occupation, and a maximum collision probability.

In an embodiment, the step of adjusting further comprises: determining a number of resource elements per control channel based on a resource usage rate.

In an embodiment, the method further comprises: assigning at least one of the control channels to a user device based on one or more bands supported by the user device.

In an embodiment, the method further comprises: assigning at least one of the control channels to a user device based on a traffic requirement of the user device. The traffic requirement comprises at least one of: a delay requirement, a throughput requirement and a quality of service requirement.

In an embodiment, the step of adjusting further comprises: aligning the resource allocation for the control channels with a resource allocation for control channels at a neighboring network node.

In an embodiment, the step of adjusting further comprises: adjusting the resource allocation to avoid interference with a neighboring network node.

In an embodiment, the method further comprises: receiving a resource allocation template for control channels from a neighboring network node. The step of adjusting is performed further based on the resource allocation template.

In an embodiment, the method further comprises: receiving a token associated with the resource allocation template from the neighboring network node, the token indicating whether the network node is authorized to modify the resource allocation template.

In a second aspect, a network node for dynamic resource allocation for control channels is provided. The network node comprises: a monitoring unit configured to monitor a control channel load on the network node; and an adjusting unit configured to adjust resource allocation for control channels based on the control channel load.

In a third aspect, a network node for dynamic resource allocation for control channels is provided. The network node comprises a transceiver, a processor and a memory. The memory contains instructions executable by the processor whereby the network node is operative to: monitor a control channel load on the network node; and adjust resource allocation for control channels based on the control channel load.

The above embodiments of the first aspect are also applicable for the second and third aspects.

In a fourth aspect, a method in a network node for dynamic resource allocation for control channels is provided. The method comprises: monitoring a first control channel load on the network node; receiving from a neighboring network node an indication of a second control channel load on the neighboring network node; and adjusting resource allocation for control channels based on the first and second control channel loads.

In an embodiment, the resource allocation is adjusted based on a maximum of the first and second control channel loads.

In an embodiment, the resource allocation is adjusted based on a sum of the first and second control channel loads.

In an embodiment, the method further comprises: transmitting to the neighboring network node an indication of the first control channel load.

In an embodiment, the method further comprises: transmitting to the neighboring network node a request for adjusting resource allocation for control channels at the neighboring network node.

In an embodiment, the method further comprises: receiving from the neighboring network node an indication of at least one of: a first set of resource elements recommended to be used by the network node and a second set of resource elements recommended not to be used by the network node. The step of adjusting is performed further based on at least one of the first set of resource elements and the second set of resource elements.

In an embodiment, the method further comprises: transmitting to the neighboring network node an indication of a set of candidate resource elements to be allocated.

In an embodiment, the method further comprises: receiving a resource allocation template for control channels from the neighboring node. The step of adjusting is performed further based on the resource allocation template.

In an embodiment, the method further comprises: receiving a token associated with the resource allocation template from the neighboring network node, the token indicating whether the network node is authorized to modify the resource allocation template.

In a fifth aspect, a network node for dynamic resource allocation for control channels is provided. The network node comprises: a monitoring unit configured to monitor a first control channel load on the network node; a communicating unit configured to receive from a neighboring network node an indication of a second control channel load on the neighboring network node; and an adjusting unit configured to adjust resource allocation for control channels based on the first and second control channel loads.

In a sixth aspect, a network node for dynamic resource allocation for control channels is provided. The network node comprises: a transceiver, a processor and a memory. The memory contains instructions executable by the processor whereby the network node is operative to: monitor a first control channel load on the network node; receive from a neighboring network node an indication of a second control channel load on the neighboring network node; and adjust resource allocation for control channels based on the first and second control channel loads.

The above embodiments of the fourth aspect are also applicable for the fifth and sixth aspects.

With the embodiments of the present disclosure, a control channel load on a network node is monitored and resource allocation for control channels on the network node is adjusted based on the control channel load. In this way, the resource allocation for control channels can be adapted to changes in the control channel load. Accordingly, resources can be allocated for control channels in a more flexible and efficient way.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be noted that the following embodiments are illustrative only, rather than limiting the scope of the disclosure.

Figure 3:
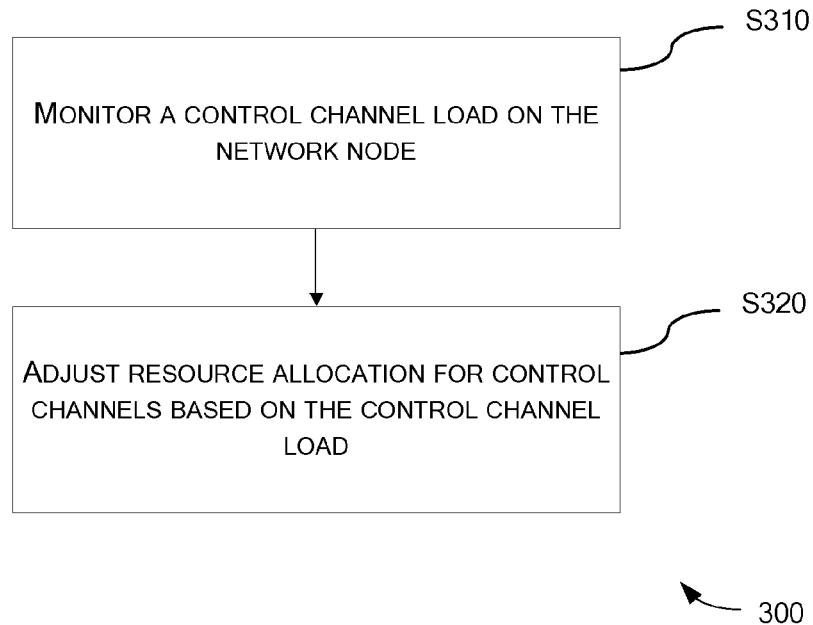
FIG. 3 is a flowchart illustrating a method for dynamic resource allocation for control channels according to an embodiment of the present disclosure.

FIG. 3 is a flowchart illustrating a method 300 for dynamic resource allocation for control channels according to an embodiment of the present disclosure. The method 300 can be performed at a network node (e.g., AN 104 or AN 106 in FIG. 1). In the context of the present disclosure, "control channels" refer to channels carrying control information, including common, shared and dedicated control channels. The method 300 includes the following steps.

At step S310, a control channel load on the network node is monitored.

In an example, the control channel load can be monitored based on a number of active user devices served by the network node. Alternatively or additionally, the control channel load can be monitored based on a number of active transmissions to/from the network node. Alternatively or additionally, the control channel load can be monitored based on a number of resource requests from user devices served by the network node.

At step S320, resource allocation for control channels is adjusted based on the control channel load.

In an example, in the step S320, a current load status of the network node can be determined first based on the control channel load. For example, a load per control channel can be estimated based on the control channel node.

Then, the current load status can be determined to be overloaded with respect to the control channel load when the load per control channel is higher than a first threshold, or to be underloaded with respect to the control channel load when the load per control channel estimated is lower than a second threshold. As an example, the load per control channel can be measured by an average number of REs actually occupied by each control channel.

Here, if the current load status is determined to be overloaded with respect to the control channel load, a number of control channels on the network node can be increased. On the other hand, if the current load status is determined to be underloaded with respect to the control channel load, a number of control channels on the network node can be decreased. As an example, the number of control channels on the network node can be increased or decreased by a fixed step each time, until the network node is no longer overloaded or underloaded with respect to the control channel load.

In an example, in the step S320, a number of control channels, N, required for the control channel load can be determined based on a maximum allowable load per control channel. That is, $$N = \text{Ceiling}(L/L_{mpc}) \quad (1)$$

where L denotes the monitored control channel load and $L_{mpc}$ denotes the maximum allowable load per control channel.

Here, the maximum allowable load per control channel can be dependent on a maximum failure rate of requests. For example, a control channel may have a maximum failure rate of requests and the number of simultaneous requests that can be served with the maximum failure rate can be calculated. Alternatively or additionally, the maximum allowable load per control channel can be dependent on a maximum allowable delay between a request for a control channel and its corresponding response. For example, the load per control channel shall not be too high to cause a delay between a request for the control channel and its corresponding response to be higher than the maximum allowable delay. Alternatively or additionally, the maximum allowable load per control channel can be dependent on a maximum allowable channel occupation and/or a maximum allowable collision probability. For example, when a control channel is spread in time and/or frequency domains, if these domains are two crowded, the control channel may not be decodable. Hence, a channel may have a maximum allowable channel occupation and/or a maximum allowable collision probability to ensure its decodability. In the case where the number, N, of control channels required for the control channel load is determined, the number of control channels on the network node can be increased or decreased directly to the number N.

Alternatively, in the step S320, a number of REs per control channel can be determined based on a resource usage rate. For example, for a random access channel, the relationship between the number of REs and the resource usage rate can be modeled as:

$$P_b = B(E, m) = \frac{\frac{E^m}{m!}}{\sum_{i=0}^{m} \frac{E^i}{i!}} \quad (2)$$

where $P_b$ denotes a desired probability of failure, $B(\ )$ is the Erlang function, E denotes a resource usage rate in Erlangs, and m denotes the number of REs. The number of REs can be determined by finding a value of m that satisfies $P_b$ according to Equation (2).

In an example, at least one of the control channels can be assigned to a user device (e.g., the user device 110, 112, 114, 116 or 118 in FIG. 1) based on one or more bands supported by the user device. For example, only the control channel(s) within the band(s) supported by the user device will be assigned to the user device, so as to ensure that the user device can receive and decode the control channel while avoiding waste of resource and reducing overhead associated with the resource assignment.

In an example, at least one of the control channels can be assigned to a user device (e.g., the user device 110, 112, 114, 116 or 118 in FIG. 1) based on a traffic requirement of the user device. Here, the traffic requirement may include at least one of a delay requirement, a throughput requirement and a quality of service requirement. For example, a control channel that meets the traffic requirement (e.g., low delay, high throughput and/or high reliability) can be assigned to the user device.

In an example, in the step S320, the resource allocation for the control channels can be aligned with a resource allocation for control channels at a neighboring network node. For example, in the example shown in FIG. 1, the AN 104 can align its resource allocation for the control channels with the resource allocation for control channels at the AN 106, i.e., the two ANs may have the same number of control channels, the same number of REs in the respective control channels, and/or even the same time/frequency positions for these REs. In this way, when a user device (e.g., the user device 116) moves from the coverage of the AN 104 to the coverage of the AN 106, it is possible for the user device to decode the control channels more easily and quickly.

In an alternative example, in the step S320, the resource allocation can be adjusted to avoid interference with a neighboring network node. For example, the AN 104 and the AN 106 can allocate different time/frequency resources for their control channels, so as to avoid inter-cell interference on these control channels.

Figure 1:
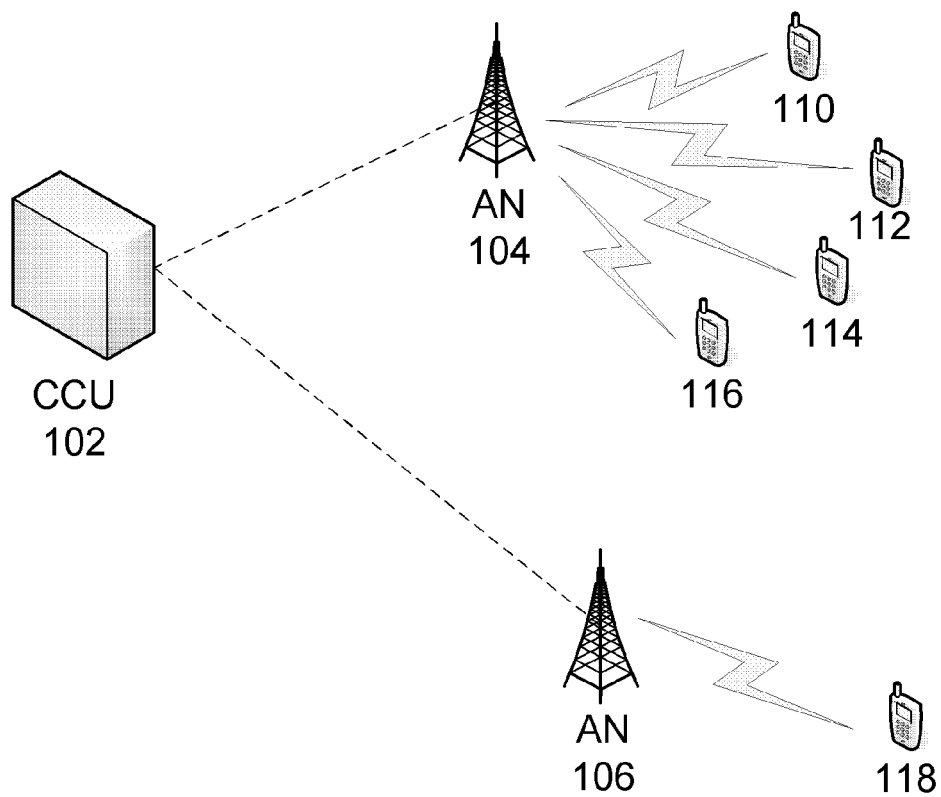
FIG. 1 is a schematic diagram showing an exemplary structure of a mobile network.
Figure 2:
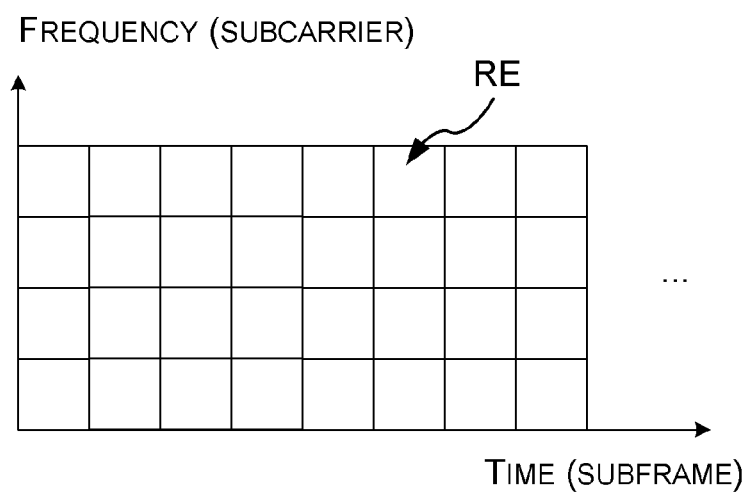
FIG. 2 is a schematic diagram showing resources in an exemplary carrier in a mobile network.

In an example, a resource allocation template for control channels can be received from a neighboring network node. In the step S320, the resource allocation for control channels can be adjusted further based on the resource allocation template. Here, the resource allocation template may indicate a number of REs available to be allocated for control channels in a network node or a group of network nodes (e.g., a cluster of ANs under control of a CCU, as shown in FIG. 1). In the step S320, the REs to be allocated to the control channels can be selected from the available REs indicated in the resource allocation template.

Further, a token associated with the resource allocation template can be received from the neighboring network node. The token indicates whether the network node is authorized to modify the resource allocation template. If the network node is authorized, it can use REs not indicated in the template and/or modify the template before sending it to another node. For example, the template may only be valid for a predetermined period and, after the template expires, only the network node indicated as authorized by the token can create a new template.

Figure 4:
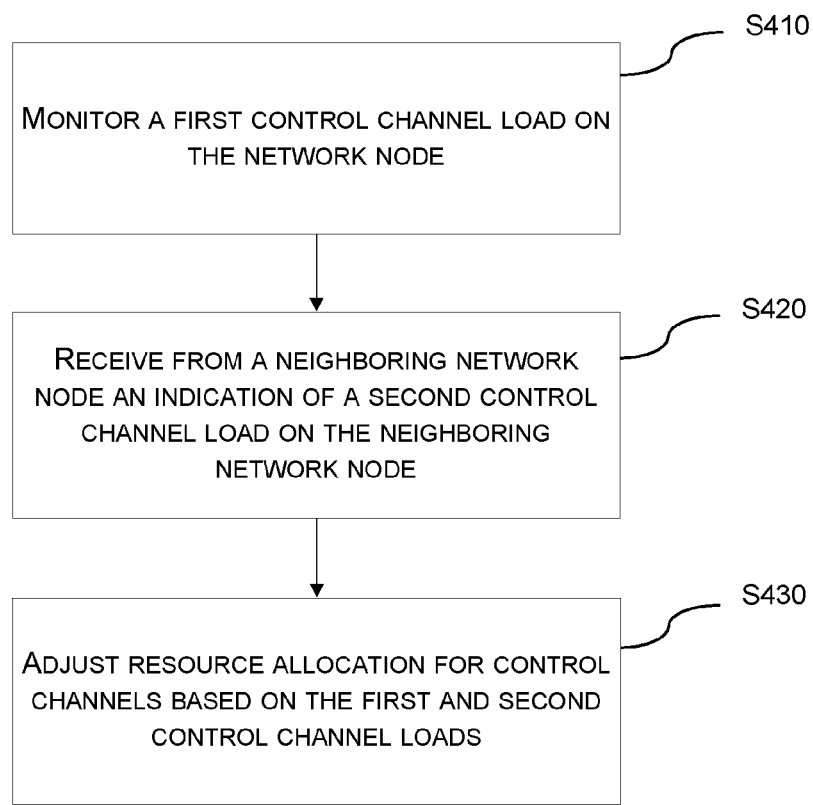
FIG. 4 is a flowchart illustrating a method for dynamic resource allocation for control channels according to another embodiment of the present disclosure.

FIG. 4 is a flowchart illustrating a method 400 for dynamic resource allocation for control channels according to an embodiment of the present disclosure. The method 400 can be performed at a network node (e.g., AN 104 or AN 106 in FIG. 1). The method 400 includes the following steps.

At step S410, a first control channel load on the network node is monitored. The step S410 is similar to the step S310 as described above in connection with FIG. 3 and the details thereof will thus be omitted here.

At step S420, an indication of a second control channel load on a neighboring network node is received from the neighboring network node. For example, the AN 104 can receive from the AN 106 an indication of the control channel load on the AN 106, which can be monitored by the AN 106 in the similar way to what has been described in connection with the step S310 in FIG. 3.

At step S430, resource allocation for control channels is adjusted based on the first and second control channel loads.

In an example, in the step S430, the resource allocation is adjusted based on a maximum of the first and second control channel loads. Alternatively, in the step S430, the resource allocation is adjusted based on a sum of the first and second control channel loads. Here, the adjustment in the step S430 is similar to the adjustment in the step S320 as described above in connection with FIG. 3, with the control channel load in the step S320 being replaced with the maximum or sum of the first and second control channel loads. Accordingly, the details of the adjustment in the step S430 will be omitted here. It is to be noted here that using the sum of the first and second control channel loads would be of particular benefit to contention based control channel, since in this case loads on neighboring nodes contribute to the overall interference level on the network node and can be considered as an additional "effective" load on the network node.

In an example, an indication of the first control channel load can be transmitted to the neighboring network node, such that the neighboring network node can also adjust its resource allocation for control channels based on the first and second control channel loads.

In an example, a request can be transmitted to the neighboring network node for adjusting resource allocation for control channels at the neighboring network node. For example, the AN 104 can transmit to the AN 106 a request including an indication of the adjusted resource allocation at the AN 104, such that the AN 106 can adjust its resource allocation for control channels accordingly, e.g., to align with the adjusted resource allocation at the AN 104, or to avoid inter-cell interference between them.

In an example, an indication can be received from the neighboring network node, the indication indicating at least one of: a first set of REs recommended to be used by the network node and a second set of REs recommended not to be used by the network node. The adjustment in the step S430 can be performed further based on at least one of the first set of REs and the second set of REs. Further, an indication of a set of candidate REs to be allocated can be transmitted to the neighboring network node. This will be explained in further detail with reference to FIG. 5.

Figure 5:
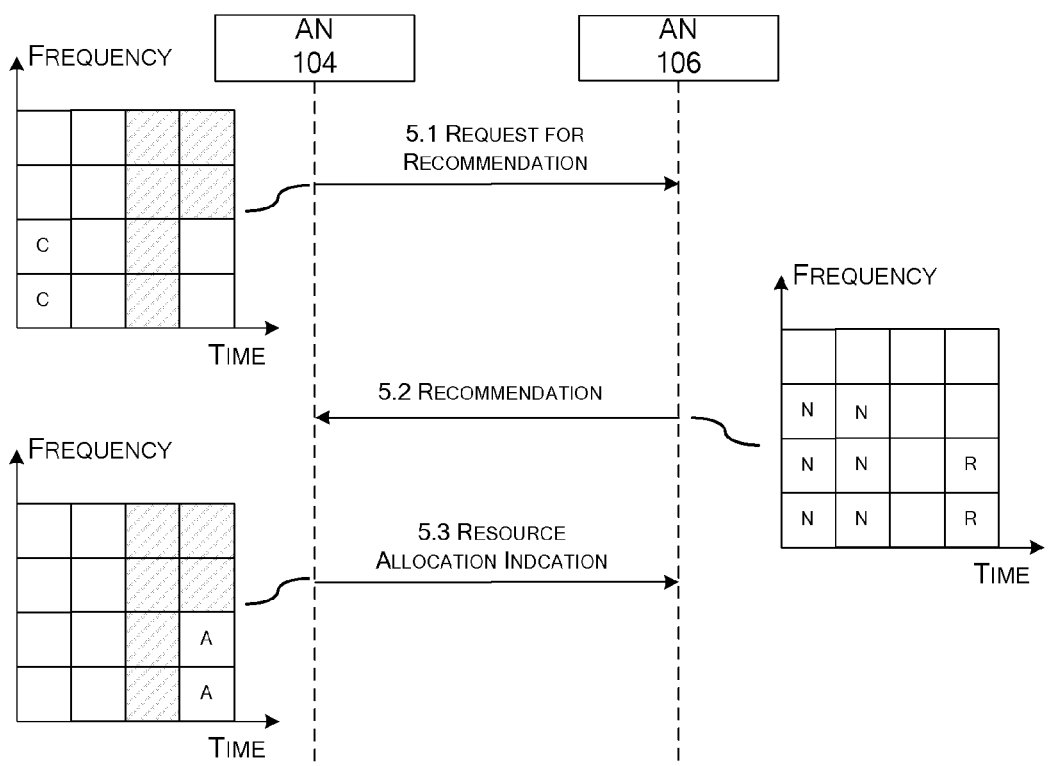
FIG. 5 is a sequence diagram showing coordination between two network nodes for resource allocation.

FIG. 5 is a sequence diagram showing coordination between two network nodes (e.g., AN 104 and AN 106 in FIG. 1) for resource allocation. As shown in FIG. 5, at 5.1, the AN 104 sends to the AN 106 a request for recommendation, including an indication of candidate REs to be allocated for control channels at the AN 104, labeled as "C", and REs not to be allocated for control channels at the AN 104 (e.g., REs suffering from high interference or reserved for other purposes), indicated by hatchings. At 5.2, the AN 106 sends a recommendation message to the AN 104, including REs recommended to be used by the AN 104, labeled as "R", and REs not recommended to be used by the AN 104, labeled as "N". In accordance with the REs recommended or not recommended in the recommendation message, the AN 104 adjusts its resource allocation by allocating REs labeled as "A", instead of REs labeled as "C", for control channels and sends an indication to the AN 106 accordingly at 5.3.

Figure 6:
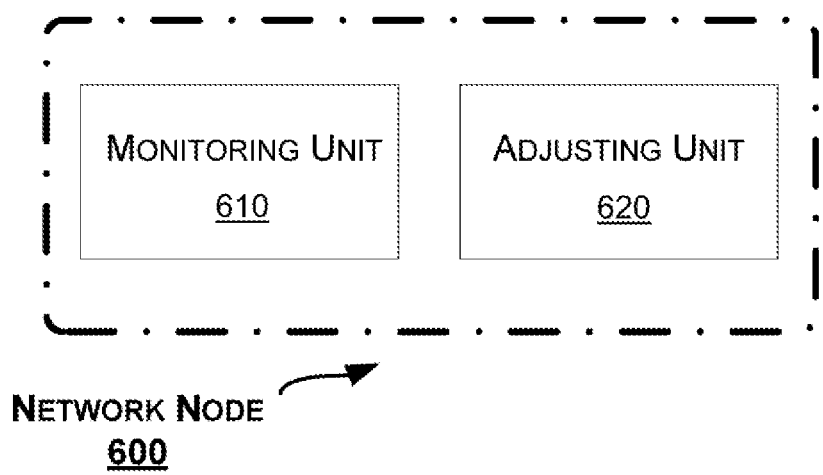
FIG. 6 is a block diagram of a network node according to an embodiment of the present disclosure.

Correspondingly to the method 300 as described above, a network node is provided. FIG. 6 is a block diagram of a network node 600 for dynamic resource allocation for control channels according to an embodiment of the present disclosure. The network node 600 can be e.g., AN 104 or AN 106 in FIG. 1.

As shown in FIG. 6, the network node 600 includes a monitoring unit 610 configured to monitor a control channel load on the network node. The network node 600 further includes an adjusting unit 620 configured to adjust resource allocation for control channels based on the control channel load.

In an embodiment, the adjusting unit 620 is configured to: determine a current load status of the network node based on the control channel load; increase a number of control channels on the network node if the current load status is determined to be overloaded with respect to the control channel load; and decrease a number of control channels on the network node if the current load status is determined to be underloaded with respect to the control channel load.

In an embodiment, the adjusting unit 620 is configured to determine the current load status by: estimating a load per control channel based on the control channel node; determining the current load status to be overloaded with respect to the control channel load when the load per control channel is higher than a first threshold, or to be underloaded with respect to the control channel load when the load per control channel estimated is lower than a second threshold.

In an embodiment, the monitoring unit 610 is configured to monitor the control channel load based on at least one of: a number of active user devices served by the network node, a number of active transmissions to/from the network node, and a number of resource requests from user devices served by the network node.

In an embodiment, the adjusting unit 620 is further configured to determine a number of control channels required for the control channel load based on a maximum allowable load per control channel, the maximum allowable load per control channel being dependent on at least one of: a maximum failure rate of requests, a maximum delay, a maximum channel occupation, and a maximum collision probability.

In an embodiment, the adjusting unit 620 is further configured to determine a number of resource elements per control channel based on a resource usage rate.

In an embodiment, the network node 600 further includes an assigning unit (not shown) configured to assign at least one of the control channels to a user device based on one or more bands supported by the user device.

In an embodiment, the network node 600 further includes an assigning unit (not shown) configured to assign at least one of the control channels to a user device based on a traffic requirement of the user device. The traffic requirement includes at least one of: a delay requirement, a throughput requirement and a quality of service requirement.

In an embodiment, the adjusting unit 620 is further configured to align the resource allocation for the control channels with a resource allocation at a neighboring network node for control channels.

In an embodiment, the adjusting unit 620 is further configured to adjust the resource allocation to avoid interference with a neighboring network node.

In an embodiment, the network node 600 further includes a receiving unit (not shown) configured to receive a resource allocation template for control channels from a neighboring network node. The adjusting unit 620 is configured to adjust the resource allocation further based on the resource allocation template.

In an embodiment, the receiving unit is further configured to receive a token associated with the resource allocation template from the neighboring network node, the token indicating whether the network node is authorized to modify the resource allocation template.

Each of the units 610-620 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 3.

Figure 7:
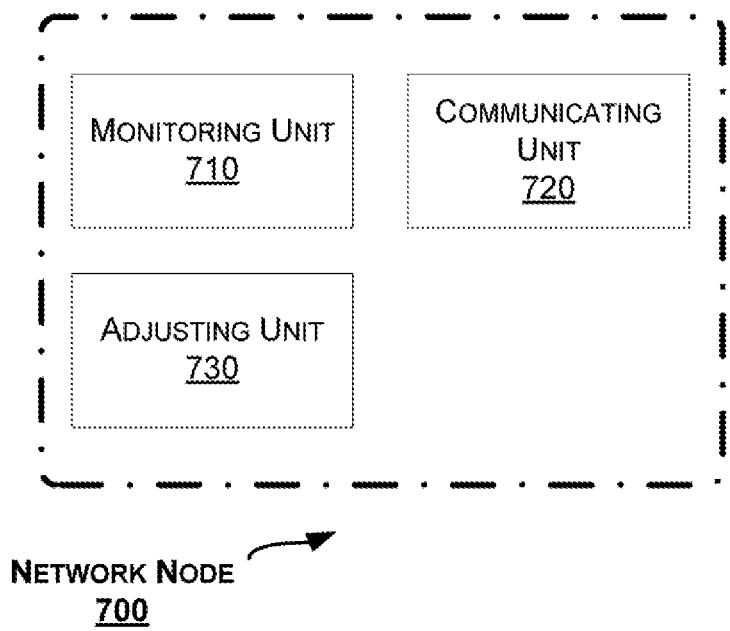
FIG. 7 is a block diagram of a network node according to another embodiment of the present disclosure.

Correspondingly to the method 400 as described above, a network node is provided. FIG. 7 is a block diagram of a network node 700 for dynamic resource allocation for control channels according to another embodiment of the present disclosure.

As shown in FIG. 7, the network node 700 includes a monitoring unit 710 configured to monitor a first control channel load on the network node. The network node 700 further includes a communicating unit 720 configured to receive from a neighboring network node an indication of a second control channel load on the neighboring network node. The network node 700 further includes an adjusting unit 730 configured to adjust resource allocation for control channels based on the first and second control channel loads.

In an embodiment, the adjusting unit 730 is configured to adjust the resource allocation based on a maximum of the first and second control channel loads.

In an embodiment, the adjusting unit is 730 configured to adjust the resource allocation based on a sum of the first and second control channel loads.

In an embodiment, the communicating unit 720 is further configured to transmit to the neighboring network node an indication of the first control channel load.

In an embodiment, the communicating unit 720 is further configured to transmit to the neighboring network node a request for adjusting resource allocation for control channels at the neighboring network node.

In an embodiment, the communicating unit 720 is further configured to receive from the neighboring network node an indication of at least one of: a first set of resource elements recommended to be used by the network node and a second set of resource elements recommended not to be used by the network node. The adjusting unit 730 is configured to adjust the resource allocation further based on at least one of the first set of resource elements and the second set of resource elements.

In an embodiment, the communicating unit 720 is further configured to transmit to the neighboring network node an indication of a set of candidate resource elements to be allocated.

In an embodiment, the communicating unit 720 is further configured to receive a resource allocation template for control channels from the neighboring node. The adjusting unit 730 is configured to adjust the resource allocation further based on the resource allocation template.

In an embodiment, the communicating unit 720 is further configured to receive a token associated with the resource allocation template from the neighboring network node, the token indicating whether the network node is authorized to modify the resource allocation template.

Each of the units 710-730 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 4.

Figure 8:
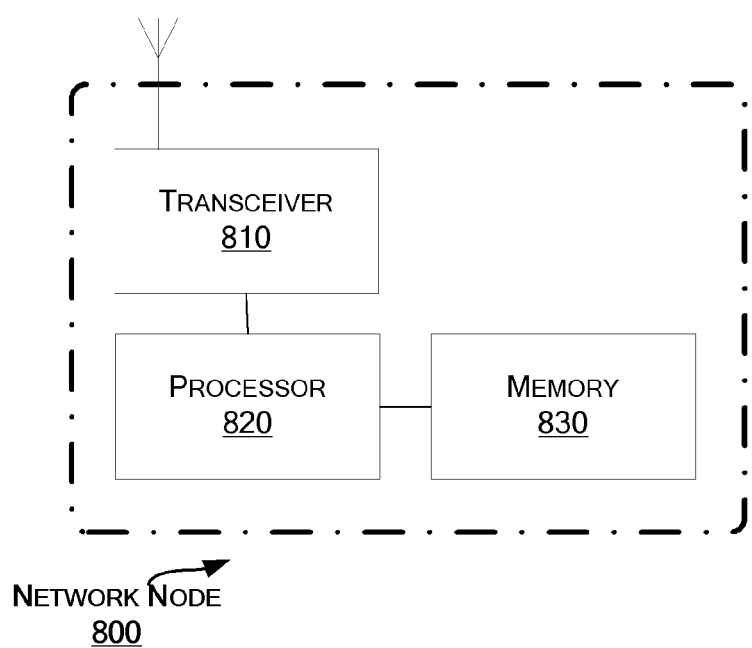
FIG. 8 is a block diagram of a network node according to another embodiment of the present disclosure.

FIG. 8 is a block diagram of a network node 800 for dynamic resource allocation for control channels according to another embodiment of the present disclosure.

The network node 800 includes a transceiver 810, a processor 820 and a memory 830. The memory 830 contains instructions executable by the processor 820 whereby the network node 800 is operative to: monitor a control channel load on the network node; and adjust resource allocation for control channels based on the control channel load.

Alternatively, the memory 830 contains instructions executable by the processor 820 whereby the network node 800 is operative to: monitor a first control channel load on the network node; receive from a neighboring network node an indication of a second control channel load on the neighboring network node; and adjust resource allocation for control channels based on the first and second control channel loads.

The present disclosure also provides at least one computer program product in the form of a non-volatile or volatile memory, e.g., an Electrically Erasable Programmable Read-Only Memory (EEPROM), a flash memory and a hard drive. The computer program product includes a computer program. The computer program includes: code/computer readable instructions, which when executed by the processor 820 causes the network node 800 to perform the actions, e.g., of the procedure described earlier in conjunction with FIG. 3 or 4.

The computer program product may be configured as a computer program code structured in computer program modules. The computer program modules could essentially perform the actions of the flow illustrated in FIG. 3 or 4.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network node for dynamic resource allocation for a plurality of control channels carrying control information, comprising:
monitoring a control channel load on the network node;
receiving a resource allocation template and a token associated with the resource allocation template, the resource allocation template indicating a number of resource elements available to be allocated for the plurality of control channels allocated to the network node or a group of network nodes that includes the network node, the token indicating that the network node is authorized to modify the resource allocation template; and
based on the control channel load and the token authorizing the network node to modify the resource allocation template, adjusting resource allocation for the plurality of control channels by allocating, to at least one of the plurality of control channels carrying the control information, at least one resource element not indicated in the resource allocation template by increasing a number of control channels allocated to the network node, and
wherein the resource allocation template is valid only for a predetermined period and, after the predetermined period expires, the network node indicated by the token can create a new resource allocation template.

2. The method of claim 1, wherein said adjusting comprises:
determining a current load status of the network node based on the control channel load; and
increasing a number of control channels on the network node in response to determining that the current load status is overloaded with respect to the control channel load.

3. The method of claim 2, wherein said determining comprises:
estimating a load per control channel based on the control channel load;
determining the current load status to be overloaded with respect to the control channel load when the load per control channel is higher than a first threshold, or to be underloaded with respect to the control channel load when the load per control channel estimated is lower than a second threshold.

4. The method of claim 1, wherein the control channel load is monitored based on at least one of: a number of active user devices served by the network node and a number of resource requests from user devices served by the network node.

5. The method of claim 1, wherein said adjusting further comprises:
determining a number of control channels required for the control channel load based on a maximum allowable load per control channel, the maximum allowable load per control channel being dependent on at least one of: a maximum failure rate of requests, a maximum delay, a maximum channel occupation, and a maximum collision probability.

6. The method of claim 1, wherein said adjusting further comprises: determining a number of resource elements per control channel based on a resource usage rate.

7. The method of claim 1, further comprising:
assigning at least one of the control channels to a user device based on one or more bands supported by the user device.

8. The method of claim 1, wherein said adjusting further comprises: aligning the resource allocation for the control channels with a resource allocation for control channels at a neighboring network node.

9. The method of claim 1, wherein said adjusting further comprises: adjusting the resource allocation to avoid interference with a neighboring network node.

10. The method of claim 1, wherein:
monitoring the control channel load comprises determining a number of active transmissions to and from the network node; and
the resource allocation for the control channels is adjusted based on the number of active transmissions to and from the network node.

11. The method of claim 1, further comprising:
assigning at least one of the control channels to a user device based on a traffic requirement of the user device,
wherein the traffic requirement comprises at least one of: a delay requirement, a throughput requirement and a quality of service requirement.

12. A network node for dynamic resource allocation for a plurality of control channels carrying control information, comprising:
a memory storing instructions; and
a processor operable to execute the instructions to cause the network node to:
monitor a control channel load on the network node;
receive a resource allocation template and a token associated with the resource allocation template, the resource allocation template indicating a number of resource elements available to be allocated for the plurality of control channels allocated to the network node or a group of network nodes that includes the network node, the token indicating that the network node is authorized to modify the resource allocation template; and
based on the control channel load and the token authorizing the network node to modify the resource allocation template, adjust resource allocation for the plurality of control channels by allocating, to at least one of the plurality of control channels carrying the control information, at least one resource element not indicated in the resource allocation template by increasing a number of control channels allocated to the network node, and
wherein the resource allocation template is valid only for a predetermined period and, after the predetermined period expires, the network node indicated by the token can create a new resource allocation template.

13. The network node of claim 12, wherein when adjusting the resource allocation the processor is further operable to execute the instructions to cause the network node to:
determine a current load status of the network node based on the control channel load; and
increase a number of control channels on the network node in response to determining that the current load status is overloaded with respect to the control channel load.

14. The network node of claim 13, wherein when adjusting the resource allocation the processor is operable to execute the instructions to determine the current load status by:
estimating a load per control channel based on the control channel load;
determining the current load status to be overloaded with respect to the control channel load when the load per control channel is higher than a first threshold, or to be underloaded with respect to the control channel load when the load per control channel estimated is lower than a second threshold.

15. The network node of claim 12, wherein the control channel load to adjust the resource allocation to adjust the resource allocation is monitored based on at least one of: a number of active user devices served by the network node and a number of resource requests from user devices served by the network node.

16. The network node of claim 12, wherein when adjusting the resource allocation the processor is further operable to execute the instructions to cause the network node to determine a number of control channels required for the control channel load based on a maximum allowable load per control channel, the maximum allowable load per control channel being dependent on at least one of: a maximum failure rate of requests, a maximum delay, a maximum channel occupation, and a maximum collision probability.

17. The network node of claim 12, wherein when adjusting the resource allocation the processor is further operable to execute the instructions to cause the network node to determine a number of resource elements per control channel based on a resource usage rate.

18. The network node of claim 12, wherein the processor is further operable to execute the instructions to cause the network node to:
assign at least one of the control channels to a user device based on one or more bands supported by the user device.

19. The network node of claim 12, wherein when adjusting the resource allocation the processor is further operable to execute the instructions to cause the network node to align the resource allocation for the control channels with a resource allocation at a neighboring network node for control channels.

20. The network node of claim 12, wherein when adjusting the resource allocation the processor is further operable to execute the instructions to cause the network node to adjust the resource allocation to avoid interference with a neighboring network node.

21. The network node of claim 12, wherein:
monitoring the control channel load comprises determining a number of active transmissions to and from the network node; and
the resource allocation for the control channels is adjusted based on the number of active transmissions to and from the network node.

22. The network node of claim 12, wherein the processor is operable to execute the instructions to cause the network node to:
assign at least one of the control channels to a user device based on a traffic requirement of the user device,
wherein the traffic requirement comprises at least one of: a delay requirement, a throughput requirement and a quality of service requirement.

23. A method in a network node for dynamic resource allocation for a plurality of control channels carrying control information, comprising:
monitoring a first control channel load on the network node;
receiving from a neighboring network node an indication of a second control channel load on the neighboring network node;
receiving, from the neighboring network node, a resource allocation template and a token associated with the resource allocation template, the resource allocation template indicating a number of resource elements available to be allocated for the plurality of control channels allocated to the network node or a group of network nodes that includes the network node, the token indicating that the network node is authorized to modify the resource allocation template; and
based on the first control channel load, the second control channel load, and the token authorizing the network node to modify the resource allocation template, adjusting resource allocation for the plurality of control channels by allocating, to at least one of the plurality of control channels carrying the control information, at least one resource element not indicated in the resource allocation template by increasing a number of control channels allocated to the network node, and
wherein the resource allocation template is valid only for a predetermined period and, after the predetermined period expires, the network node indicated by the token can create a new resource allocation template.

24. The method of claim 23, wherein the resource allocation is adjusted based on a maximum of the first and second control channel loads.

25. The method of claim 23, wherein the resource allocation is adjusted based on a sum of the first and second control channel loads.

26. The method of claim 23, further comprising:
transmitting to the neighboring network node an indication of the first control channel load.

27. The method of claim 23, further comprising:
transmitting to the neighboring network node a request for adjusting resource allocation for control channels at the neighboring network node.

28. The method of claim 23, further comprising:
receiving from the neighboring network node an indication of at least one of: a first set of resource elements recommended to be used by the network node and a second set of resource elements recommended not to be used by the network node,
wherein said adjusting is further based on at least one of the first set of resource elements and the second set of resource elements.

29. The method of claim 28, further comprising:
transmitting to the neighboring network node an indication of a set of candidate resource elements to be allocated.

30. The method of claim 23, wherein:
monitoring the control channel load comprises determining a number of active transmissions to or from the network node; and
the resource allocation for the control channels is adjusted based on the number of active transmissions to or from the network node.

31. A network node for dynamic resource allocation for a plurality of control channels carrying control information, comprising:
a memory storing instructions; and
a processor operable to execute the instructions to cause the network node to:
monitor a first control channel load on the network node;
receive, from a neighboring network node, an indication of a second control channel load on the neighboring network node;
receive, from the neighboring network node, a resource allocation template and a token associated with the resource allocation template, the resource allocation template indicating a number of resource elements available to be allocated for the plurality of control channels allocated to the network node or a group of network nodes that includes the network node, the token indicating that the network node is authorized to modify the resource allocation template; and based on the control channel load, the second control channel load, and the token authorizing the network node to modify the resource allocation template, adjust resource allocation for the plurality of control channels by allocating, to at least one of the plurality of control channels carrying the control information, at least one resource element not indicated in the resource allocation template by increasing a number of control channels allocated to the network node, and wherein the resource allocation template is valid only for a predetermined period and, after the predetermined period expires, the network node indicated by the token can create a new resource allocation template.

32. The network node of claim 31, wherein when adjusting the resource allocation the processor is further operable to execute the instructions to cause the network node to adjust the resource allocation based on a maximum of the first and second control channel loads.

33. The network node of claim 31, wherein when adjusting the resource allocation the processor is further operable to execute the instructions to cause the network node to adjust the resource allocation based on a sum of the first and second control channel loads.

34. The network node of claim 31, wherein the processor is further operable to execute the instructions to cause the network node to transmit to the neighboring network node an indication of the first control channel load.

35. The network node of claim 31, wherein the processor is further operable to execute the instructions to cause the network node to transmit to the neighboring network node a request for adjusting resource allocation for control channels at the neighboring network node.

36. The network node of claim 31, wherein the processor is further operable to execute the instructions to cause the network node to:
  receive from the neighboring network node an indication of at least one of: a first set of resource elements recommended to be used by the network node and a second set of resource elements recommended not to be used by the network node, and
  adjust the resource allocation further based on at least one of the first set of resource elements and the second set of resource elements.

37. The network node of claim 36, wherein the processor is further operable to execute the instructions to cause the network node to transmit to the neighboring network node an indication of a set of candidate resource elements to be allocated.

38. The network node of claim 31, wherein:
  monitoring the control channel load comprises determining a number of active transmissions to or from the network node; and
  the resource allocation for the control channels is adjusted based on the number of active transmissions to or from the network node.

* * * * *